UNITED STATES PATENT OFFICE 2,501,372

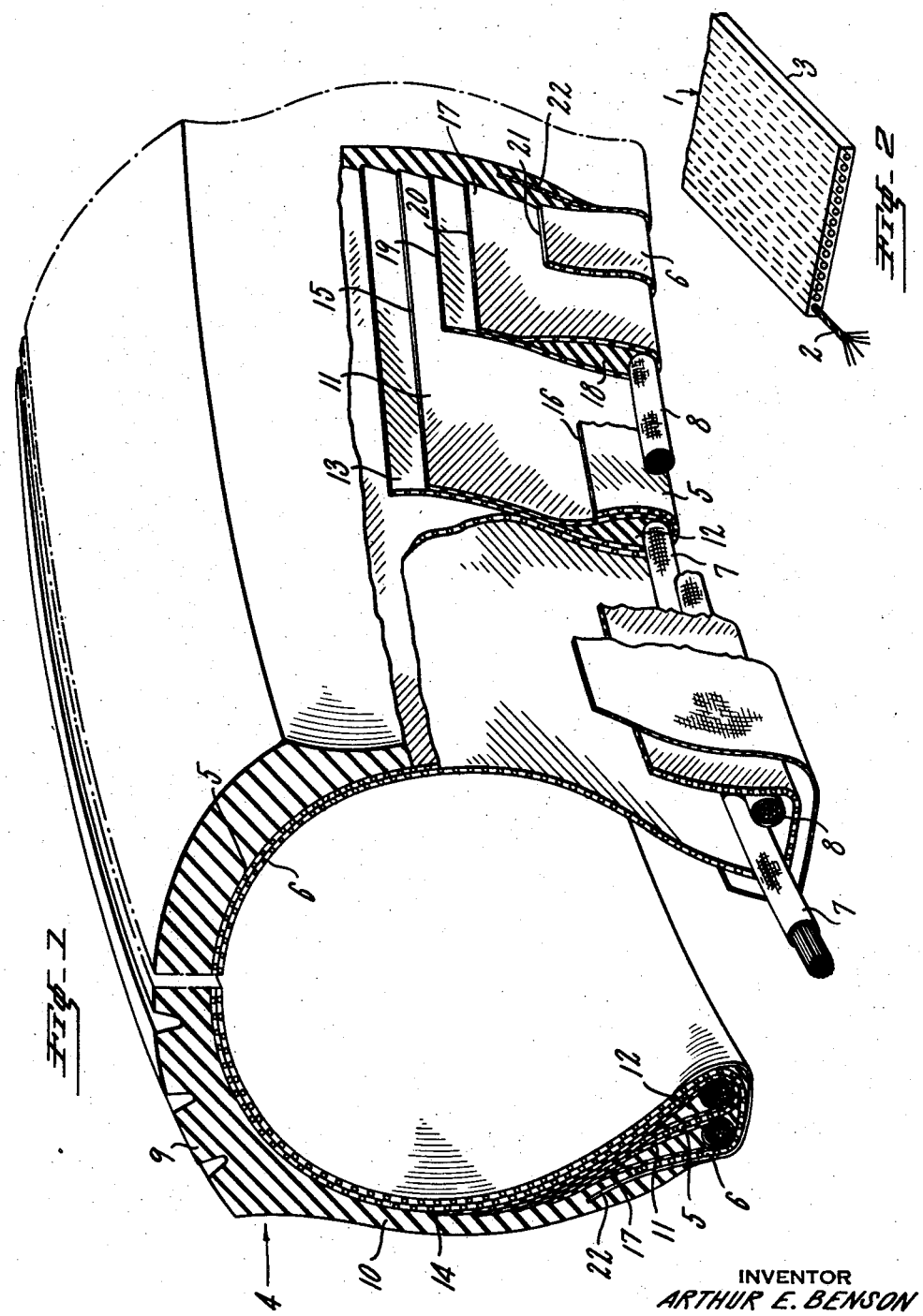

WIRE FABRIC TIRE CASING

Arthur E. Benson, Detroit, Mich., assignor to United States Rubber Company, New York, N. Y., a corporation of New Jersey Application June 27, 1947, Serial No. 757,445

2 Claims. (Cl. 152—354)

My invention relates to a wire fabric tire casing and more particularly to a pneumatic tire casing employing wire fabric in the reinforcing elements and plies.

It is an object of my invention to provide a new and improved wire fabric tire casing for pneumatic tires which may be operated at substantially the same inflation pressures as tire casings of like rating using conventional textile fabric. When so inflated, the casing is one which exhibits excellent riding qualities due to the arrangement of the plies and reinforcing elements which provide a very flexible casing construction.

Another object of my invention is the provision of a wire fabric tire casing which may be constructed by processes and on equipment employed in the manufacture of textile fabric casings. The wire tire is lighter in weight and is resistant to heat and fatigue failures occurring in normal textile tire use. The construction is more resistant to cuts and punctures; it has greater rupture resistance, greater load carrying capacity due to larger air volume, and negligible carcass growth.

In the accompanying drawing,

Fig. 1 illustrates a sectional view through a tire casing constructed in accordance with my invention with certain of the parts broken away; and Fig. 2 is a perspective view of the wire fabric used in constructing the casing.

Referring to the drawing, Fig. 2 illustrates in enlarged detail the wire fabric 1 utilized in the construction of the wire tire. The fabric is formed of a plurality of twisted steel wire cables 2 arranged side by side in parallel relationship and which are imbedded in rubber stock 3 which serves to bond the cables together without the use of tying cords. The construction forms, in effect, a weftless wire fabric. One form of suitable cable comprises twenty-one wires of .0059 inch diameter twisted together and the cables are uniformly spaced 17 to 20 to the inch of fabric for use in heavy service tires. In order to obtain an exceptionally strong adhesive bond with the rubber stock, the cables are brass plated after the twisting operation. The fabric assembly is one which is extremely flexible and may be made and assembled in any desired length or width suitable for fabricating into a tire casing by the well known drum assembly method of manufacture.

The tire casing 4, illustrated in Fig. 1, is formed with two plies 5 and 6, each constructed of the wire fabric 1. The plies are arranged so that the wire cables in the fabric extend at an angle to each other, approaching right angles at the crown or tread portion, to increase the flexibility of the construction and to make the casing more fatigue resisting. The plies are assembled together with a plurality of bead wire bundles 7 and 8 and are united with rubber stock forming a conventional tread portion 9 and side walls 10. In the description to follow, it should be noted that the left hand portion of Fig. 1 illustrates the tire section completely manufactured and vulcanized, whereas the right hand portion illustrates broken-away sections through the casing components assembled prior to vulcanization.

Prior to assembly of the plies with the bead wires, a flipper 11 is folded around the inner bead wire bundle 7 and an apex strip of rubber stock 12 is placed between the folds of the flipper and on top of the bead wire so that when the tire casing is vulcanized it assumes the form shown in Fig. 1. The purpose of the apex rubber strip filler 12 is to fill up the space above the bead wire and prevent any localized hinge points, sharp breaks or curves in either the flipper 11 or the adjacent folded ply 5.

The flipper 11 itself is constructed of wire fabric. The construction is similar to that of the ply fabric shown by Fig. 2 in that a series of wire cables are assembled in parallel relationship and imbedded in rubber stock. However, in order to increase the flexibility of the flipper fabric, I prefer to make the wire cables of smaller diameter than those of the plies. For example, I have found that a suitable flipper fabric may be constructed of wire cables spaced approximately fifteen to seventeen cables to the inch, each cable comprising six to seven twisted strands of 0.0059 inch diameter wire. The flipper construction, having the smaller individual cables, is more flexible than the ply fabric and hence is well suited for use in controlling and maintaining the flexibility of the tire casing at the points of stress. One advantage of using flippers of wire fabric is that the modulus of elasticity of the materials used in the flippers and plies is the same which would not be the case if textile fabric flippers were used; this provides a graduated and easily controlled increase in flexibility of the casing wall from the bead to the tread. Another advantage in using wire fabric flippers resides in the fact that they do not disintegrate under heat which is conducted from the brake drum through the metal wheel to the tire.

In manufacture, the flipper 11 is applied to the bead wire so that the wire cables of the inner fold or end 13 are disposed substantially at right angles to the cables in the outer adjacent ply 5. This arrangement increases the flexibility of the tire casing and gives added torsional strength on traction between the rim and the tread. An important arrangement of the flipper construction is that the inner end 13 extends upwardly from the bead wires to a point at least halfway between the bead and the tread portions, as indicated at 14 in Fig. 1. This arrangement serves to graduate the flexibility of the casing wall from a maximum at the mid-sidewall portion to a minimum at the bead portion. The outer fold 15 of the flipper 11 is terminated or spaced below the inner edge 13 to form a stepped arrangement of the flipper edges thereby assisting in a graduated flexibility of the casing wall. To positively secure the outer ply 5 to the bead wires the less flexible ply is folded around the bead wire bundle 7 and flipper 11 and terminates at a point slightly above the bead wire, as indicated at 16. The arrangement is such that the flipper 11 forms, in effect, an upward extension of the ply fabric, but of increased flexibility.

In a similar way, a second flipper 17 of wire fabric is folded around the outer bead wire bundle 8 together with an apex rubber stock filler 18. The inner and outer ends 19 and 20, respectively, of the flipper 17 are stepped down or spaced toward the bead wire bundle to give a graduated flexibility to the casing wall. This prevents coinciding edges and thus eliminates any localized hinge points of abrupt change in flexibility such as might break under stress.

The inner wire fabric ply 6 is folded and secured around both bead wire bundles 7 and 8 and terminates adjacent the outer flipper 17 at a point 21 below the outer edge 20 of the flipper. Thus the flipper 17 forms, in effect, an extension of the ply 6 of increased flexibility. The stepped relationship of the ends of the plies and flippers serves to provide a uniform increase in flexibility from the bead wires to the mid-sidewall of the casing. A conventional textile fabric chafer strip 22 is applied over the plies and flippers to protect the casing from chafing on the rim of the wheel.

The wire fabric tire casing is one which is extremely flexible due to the reduced number of plies utilized in the construction. At the same time, the dual bead wire bundles provide a stable construction for mounting on the wheel rim. The arrangement of the stepped or spaced flipper edges helps to impart a graduated flexibility to the casing wall so that the extremely flexible mid-sidewall portion merges into the stable bead portion without weak spots. By providing for maximum flexibility of the carcass portion it is possible to reduce the operating air inflation pressure of the wire tire casing to that of a conventional textile fabric casing of like rating. By utilizing flexible wire fabric of the type described, the casing may be manufactured by methods and apparatus normally employed in the manufacture of textile fabric casings.

Having thus described my invention, what I claim and desire to protect by Letters Patent is:

1. A flexible pneumatic wire tire casing including a rubber tread portion and at least two plies of wire fabric, each ply having parallel wire cables embedded in rubber, the wire cables in one of the plies extending at an angle to the cables in the other ply, at least two bead wire bundles, a flipper of wire fabric having parallel wire cables embedded in rubber, said flipper being folded around the inner bead bundle and having an end portion extending along the outer ply to a point at least halfway between the bead bundle and tread portion, the end of the outer ply being folded around said flipper and said inner bead bundle, and a second flipper of wire fabric folded around the outer bead bundle, the end of the inner ply being folded around both of said bead bundles and the second of said flippers.

2. A flexible pneumatic wire tire casing including a rubber tread portion and at least two plies of wire fabric, each ply having parallel wire cables embedded in rubber, the wire cables in one of the plies extending at an angle to the cables in the other ply, at least two bead wire bundles, a flipper of wire fabric having parallel wire cables of smaller diameter than those of the plies embedded in rubber, said flipper being folded around the inner bead bundle so that the wire cables in the flipper extend at an angle to the cables in the adjacent ply, an apex strip of rubber stock extending between the folds of the flipper adjacent the bead bundle, the end of the outer ply being folded around said bead bundle and flipper, a second flipper of similar wire fabric folded around the outer bead bundle, and a second apex strip of rubber stock extending between the folds of the second flipper, the wire cables in the second flipper extending at an angle to the cables in the adjacent fold of the first flipper, the end of the inner ply being folded around both of said bead bundles and the second of said flippers, the ends of both flippers being stepped down toward the outer bead bundle to give a graduated flexibility to the casing wall.

ARTHUR E. BENSON.

REFERENCES CITED

The following references are of record in the file of this patent:

UNITED STATES PATENTS

| Number | Name | Date |
| --- | --- | --- |
| 1,341,663 | Neal | June 1, 1920 |
| 1,358,566 | Michero | Nov. 9, 1920 |
| 1,451,645 | Archer | Apr. 10, 1923 |
| 1,548,370 | Midgley | Aug. 4, 1925 |
| 2,000,869 | Taylor | May 7, 1935 |
| 2,006,315 | Hopkinson | June 25, 1935 |

Certificate of Correction

Patent No. 2,501,372                                                                March 21, 1950

ARTHUR E. BENSON

It is hereby certified that error appears in the printed specification of the above numbered patent requiring correction as follows:

Column 4, line 35, after the word "adjacent" insert *outer*;

and that the said Letters Patent should be read with this correction therein that the same may conform to the record of the case in the Patent Office.

Signed and sealed this 20th day of June, A. D. 1950.

[SEAL]

THOMAS F. MURPHY,
*Assistant Commissioner of Patents.*